United States Patent
Chandrashekar et al.

(10) Patent No.: US 12,034,791 B2
(45) Date of Patent: *Jul. 9, 2024

(54) ADAPTIVE CONTENT STREAMING BASED ON BANDWIDTH

(71) Applicant: Rovi Guides, Inc., San Jose, CA (US)

(72) Inventors: Padmassri Chandrashekar, Karnataka (IN); Daina Emmanuel, Bangalore (IN); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,298

(22) Filed: Feb. 28, 2023

(65) Prior Publication Data

US 2023/0283652 A1    Sep. 7, 2023

Related U.S. Application Data

(63) Continuation of application No. 17/362,058, filed on Jun. 29, 2021, now Pat. No. 11,621,991.

(51) Int. Cl.
*H04L 29/06* (2006.01)
*H04L 29/08* (2006.01)
*H04L 65/75* (2022.01)
*H04L 67/60* (2022.01)

(52) U.S. Cl.
CPC .............. *H04L 65/75* (2022.05); *H04L 67/60* (2022.05)

(58) Field of Classification Search
CPC ......... H04L 65/75; H04L 67/60; H04L 29/06; H04L 29/08

USPC ......................................................... 709/219
See application file for complete search history.

(56) References Cited

U.S. PATENT DOCUMENTS

| | | | |
|---|---|---|---|
| 9,032,077 B1 | 5/2015 | Klein et al. | |
| 9,100,509 B1 | 8/2015 | Jia et al. | |
| 9,100,657 B1 | 8/2015 | Jia et al. | |
| 10,102,626 B2 | 10/2018 | Chou et al. | |
| 10,165,036 B1 * | 12/2018 | Gigliotti | H04L 67/10 |
| 10,437,830 B2 | 10/2019 | Nguyen et al. | |
| 10,743,036 B1 * | 8/2020 | Farris | H04N 21/2353 |
| 10,778,620 B1 * | 9/2020 | Beeman | H04L 67/568 |
| 11,621,991 B2 | 4/2023 | Chandrashekar et al. | |
| 2015/0081847 A1 * | 3/2015 | Hao | H04L 65/762 709/219 |
| 2015/0113407 A1 * | 4/2015 | Hoffert | H04N 21/482 715/720 |
| 2018/0013810 A1 * | 1/2018 | Gordon | H04N 21/23439 |
| 2018/0352017 A1 | 12/2018 | Schneider et al. | |
| 2019/0005048 A1 * | 1/2019 | Crivello | G06F 16/44 |
| 2019/0109926 A1 * | 4/2019 | Hotchkies | H04L 67/01 |
| 2019/0166170 A1 | 5/2019 | Ramaswamy | |
| 2019/0182701 A1 | 6/2019 | Yi et al. | |
| 2019/0370742 A1 | 12/2019 | Ko | |
| 2020/0007453 A1 * | 1/2020 | Maniyar | H04L 49/90 |
| 2020/0127957 A1 * | 4/2020 | Monberg | H04L 67/53 |

(Continued)

*Primary Examiner* — Jude Jean Gilles
(74) *Attorney, Agent, or Firm* — Haley Guiliano LLP

(57) ABSTRACT

Systems and methods for adaptive content streaming based on bandwidth are disclosed. According to one example method, content is requested for delivery. An indication of complexity of a plurality of media content items associated with the content is received. Based on the indication of complexity and an available bandwidth at the user device, at least one of the plurality media content items is selected and retrieved from the media server.

19 Claims, 14 Drawing Sheets

(56) References Cited

U.S. PATENT DOCUMENTS

2020/0204527 A1* 6/2020 Vass .................. G06F 21/10
2020/0273099 A1 8/2020 Cella
2022/0417305 A1 12/2022 Chandrashekar et al.

* cited by examiner

| Segment | 1 | 2 | 3 | |
|---|---|---|---|---|
| Complexity | H | M | L | |
| Segment Duration | 10 | 10 | 10 | |
| Bitrate Variant 1 | 2 | 2 | 2 | |
| Bitrate Variant 2 | 4 | [4] | 4 | |
| Bitrate Variant 3 | [8] | 8 | 8 | |
| Available B/W | 6 | 6 | 6 | |
| Without Complexity Factor the Variants Chosen | 4 | 4 | 4 | |
| With Complexity Factor the Variants Chosen | 8 | 4 | 2 | Avg. Bit Rate = ~4 Mbps |

FIG. 3

```
 0  | <?xml version="1.0" encoding="UTF-8"?>
 1  | <MPD xmlns:xsi="http://www.w3.org/2001/XMLSchema-instance" xmlns="urn:mpeg:dash:schema:mpd:2011 DASH-MPD.xsd
 2  | <BaseURL>https://video.platform.com/v1</BaseURL>
 3  | <Period>
 4  | <!-- English Audio --> <COMPLEXITY="0">
 5  | <AdaptationSet mimeType="audio/mp4" codecs="mp4a.40.5" lang="en" subsegmentAlignment="true" subsegmentStartsWithSAP="1">
 6  | <Representation id="0" bandwidth="64000">
 7  | <URL>Joelsmixtape_AAC48K_064.mp4.dash<BaseURL>
 8  | </Representation>
 9  | </AdaptationSet>
10  | <!-- Video -->
11  | <AdaptationSet mimeType="video/mp4" codecs="avc1.42401E" subsegmentAlignment="true" subsegmentStartsWithSAP="1">
12  | <Representation id="1" bandwidth="1000000" width="2160" height="1440"><COMPLEXITY="2">
13  | <URL>Joelsmixtape_H264BPL30_0100.264.dash<BaseURL>
14  | </Representation>
15  | <Representation id="2" bandwidth="2000000" width="3840" height="2160"><COMPLEXITY="3">
16  | <URL>Joelsmixtape_H264BPL30_0200.264.dash<BaseURL>
17  | </Representation>
18  | </AdaptationSet>
19  | </Period>
20  | </MPD>
```

FIG. 10

```
1  <Representation id="1" codecs="avc1" mimeType="video/mp4" width="2160" height="1440" startWithSAP="1">
2    <SegmentList duration="3">
3      <SegmentURL media="main/safety101/2.m4s" mediaRange="863-7113" COMPLEXITY="L"/>
4      <SegmentURL media="main/safety101/3.m4s" mediaRange="7114-14104" COMPLEXITY="M"/>
5      <SegmentURL media="main/safety101/4.m4s" mediaRange="14105-17990" COMPLEXITY="H"/>
6    </SegmentList>
7  </Representation>
8  <Representation id="2" codecs="avc1" mimeType="video/mp4" width="3840" height="2160" startWithSAP="1">
9    <SegmentList duration="3">
10     <SegmentURL media=" main/safety201/2.m4s " mediaRange="865-11523" COMPLEXITY="L"/>
11     <SegmentURL media="main/safety201/3.m4s" mediaRange="11524-25621" COMPLEXITY="M"/>
12     <SegmentURL media="main/safety201/4.m4s" mediaRange="25622-33693" COMPLEXITY="H"/>
13   </SegmentList>
14 </Representation>
```

FIG. 11

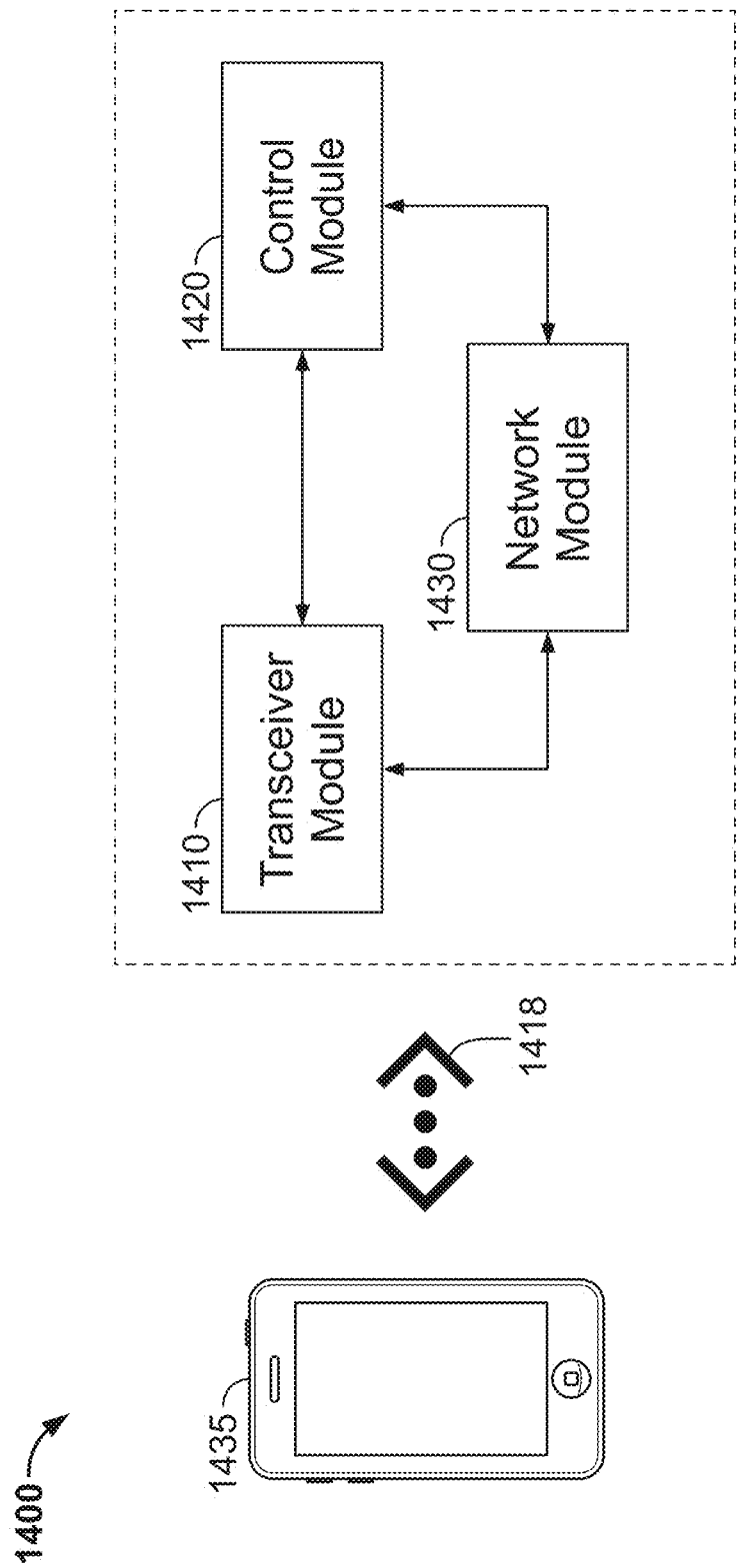

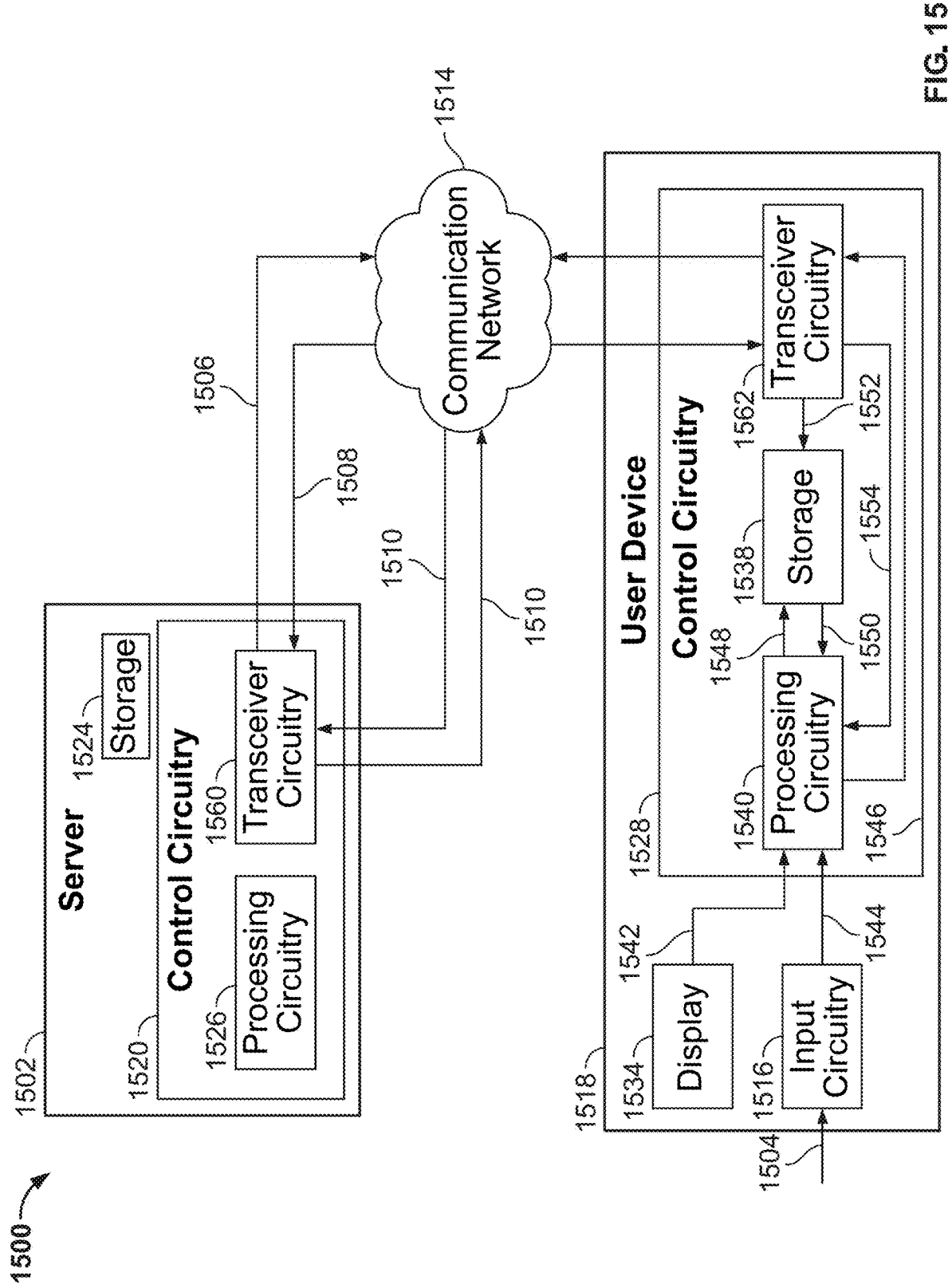

ADAPTIVE CONTENT STREAMING BASED ON BANDWIDTH

CROSS-REFERENCE TO RELATED APPLICATIONS

This application is a continuation of U.S. application Ser. No. 17/362,058, filed Jun. 29, 2021, which is hereby incorporated by reference herein in its entirety.

BACKGROUND

The present disclosure relates to adaptive content streaming systems and methods and, more particularly, to systems and methods for adapting the streaming of content to a device based on available bandwidth.

SUMMARY

Adaptive bitrate streaming (also known as adaptive streaming or adaptive video streaming) is a technology designed to deliver video to a user in the most efficient and useable quality possible. Conventional streaming media systems that deliver media assets over a network, often use adaptive bitrate algorithms to optimize a balance between providing a user with the highest possible media quality (e.g., bitrate) and minimizing playback stalling (known as buffering). By way of summary, streaming media systems aim to maximize stability by switching bitrates when, for example, the transfer rate is too slow compared to the play speed of the media asset. Most video systems select a bitrate that most closely matches an observed network bandwidth and request an appropriate quality of the next segment of the media asset that the bandwidth can accommodate at that time. In this way, the video system can provide smooth playback and a quick start of the media asset.

While in the past most video or audio streaming technologies utilized streaming protocols such as real-time transport protocol (RTP) with real-time streaming protocol (RTSP), modern adaptive streaming technologies are mostly based on hypertext transfer protocol (HTTP). Current adaptive bitrate streaming solutions, such as MPEG-DASH or Apple HLS, allow a user to select a priority of quality or reduction of buffering when watching a video. In most situations, users prefer to watch a lower-quality portion of a video rather than waiting for a higher-quality portion of the video to be downloaded. However, obtaining the highest bitrate variant of a segment of adaptive bitrate media content is not always possible based on the available bandwidth at the client device.

Accordingly, the present disclosure builds on top of the concept of 'per-title encoding' by assigning a complexity level to a scene, media content item, or a plurality of segments of an adaptive bitrate video and encoding content items based on the characteristics of their actual content (e.g., video characteristics) as opposed to utilizing a bitrate ladder for all the content items that are being prepared for streaming. In some examples, the assigning of the complexity level occurs during the encoding process, or during the generation of the manifest for the adaptive bitrate video in the form of a tag. Such a tag is signaled to a client device in order to indicate which media content item segment(s) have higher or lower complexity relative to the other media content item scenes or segments (sometimes referred to herein as media content items). In some examples, the client device prioritizes the media content items with the highest complexity (e.g., attempts to fetch the media content items at the highest available bit rate). However, fetching the highest available bit rate for each media content item is not necessary when the encoding complexity of the segment is low, and hence adding more bits will not show any noticeable improvements to the scene, by the user. That is to say that, to the user, the low complexity bitrate media content items look the same when encoded @2 Mbps or @3 Mbps, for example. The opposite is true for scenes with a high complexity encoding as more bits are needed to represent the content, else the picture will not look 'crispy' and artifacts become noticeable to the user.

Data delivery mechanisms, techniques, and systems described herein are introduced to provide a better experience for a user of a platform that provides content via adaptive bitrate technology.

In a first approach, there is provided a method for retrieving media content, the method comprising: requesting, from a user device to a media server, content for delivery; receiving, from the media server, an indication of the complexity of a plurality of media content items associated with the content; selecting, based on the indication of the complexity and an available bandwidth at the user device, at least one of the plurality of media content items; and retrieving the selected media content items from the media server. In some examples, the media content items comprise a plurality of bitrate variants.

In some examples, the selection comprises selecting, for each media content item, a bitrate variant of the media content item from the media server.

In some examples, the method further comprises determining an average available bandwidth of the user device; wherein the average is determined over an estimated time for retrieving a plurality of media content items.

In some examples, the method further comprises selecting, for content of a first complexity, lower bitrate variants, and selecting, for content of a second complexity greater than the first, higher bitrate variants. In some examples, the method further comprises determining a subset of the media content items with a combination of higher and lower complexity media content items, wherein the combination does not exceed the average available bandwidth at the user device.

In some examples, the method further comprises: detecting an increase in available bandwidth at the user device; in response to detecting the increase in available bandwidth at the user device, selecting a second subset of the plurality of media content items; and retrieving the second subset of the plurality of media content items; wherein the second subset of media content items comprises more media content items with higher complexity than the first subset of media content items.

In some examples, the method further comprises: detecting a decrease in available bandwidth at the user device; in response to detecting the decrease in available bandwidth at the user device, selecting a third subset of the plurality of media content items; and retrieving the third subset of the plurality of media content items; wherein the third subset of media content items comprises more media content items with lower complexity than the first subset of media content items.

In some examples, the first subset of media content items comprises consecutive segments of the media content.

In some examples, the request for media content delivery comprises an indication to retrieve consecutive segments of the media content.

In some examples, the method further comprises: the request for media content delivery comprising contextual information; wherein selecting the first subset of the plurality media content items is further based on the contextual information.

In some examples, the contextual information comprises at least one of a user-preferred: cast member; genre; age rating; language; director; writer; and/or content item type.

In a second approach, there is provided a method for generating a manifest for media content delivery, the method comprising: receiving, from a user device at a media server, a request for content delivery; determining a complexity factor of a plurality of media content items associated with the content; and generating a manifest, the manifest comprising a plurality of Uniform Resource Locators, URLs, and an indication of complexity of the media content items. In some examples, the media content items comprise a plurality of bitrate variants.

In some examples, the determining of the complexity factor comprises determining, for each media content item, a complexity factor for a bitrate variant of the media content item.

In some examples, the complexity factor is based on a threshold of motion, such that high motion corresponds to high complexity, and low motion corresponds to low complexity.

In some examples, generating the manifest further comprises tagging the URLs with the indication of complexity. In some examples, the request for media content delivery comprises an indication to retrieve consecutive segments of the content.

In some examples, in response to the request for media content delivery comprising an indication to retrieve consecutive segments of the media content: caching the consecutive segments of the content.

In another approach there is provided a media transmission device communicatively coupled to a media server, the media transmission device comprising a control module, a transceiver module, and a network module, configured to request, to the media server, content for delivery; receive, from the media server, an indication of complexity of a plurality of media content items associated with the content; select, based on the indication of complexity and an available bandwidth at the media transmission device, at least one of the plurality media content items; and retrieve the selected media content items from the media server.

In another approach, there is provided a system, the system comprising: means for requesting, from a user device to a media server, content for delivery; means for receiving, from the media server, an indication of complexity of a plurality of media content items associated with the content; means for selecting, based on the indication of complexity and an available bandwidth at the user device, at least one of the plurality of media content items; and means for retrieving the selected media content items from the media server.

In another approach there is provided a media server, comprising: receive, from a media transmission device, a request for content delivery; determine a complexity factor of a plurality of media content items associated with the content, and generate a manifest, the manifest comprising a plurality of Uniform Resource Locators, URLs, and an indication of complexity of the media content items.

In another approach, there is provided a non-transitory computer-readable medium having instructions encoded thereon for carrying out a method, the method comprising: requesting, from a user device to a media server, content for delivery; receiving, from the media server, an indication of complexity of a plurality of media content items associated with the content; selecting, based on the indication of complexity and an available bandwidth at the user device, at least one of the plurality media content items; and retrieving the selected media content items from the media server.

In another approach, there is provided a non-transitory computer-readable medium having instructions encoded thereon for carrying out a method, the method comprising: receiving, from a user device at a media server, a request for content delivery; determining a complexity factor of a plurality of media content items associated with the content; and generating a manifest, the manifest comprising a plurality of Uniform Resource Locators, URLs, and an indication of complexity of the media content items.

Advantages of the present disclosure allow for an uninterrupted viewing experience when a user is attempted to consume media content and/or reduce the inefficiencies of selecting a data delivery network.

BRIEF DESCRIPTION OF THE DRAWINGS

The above and other objects and advantages of the disclosures will be apparent upon consideration of the following detailed description, taken in conjunction with the accompanying drawings, in which:

FIG. 3 is a tabular representation of segment selection based on complexity and average available bandwidth, in accordance with some embodiments of the disclosure.

FIGS. 10 and 11 illustrate exemplary pseudo-code for an adaptive bitrate manifest, in accordance with some embodiments of the disclosure.

FIG. 14 illustrates an exemplary media transmission device, in accordance with some embodiments of the disclosure.

FIG. 15 is a block diagram representing devices, components of each device, and data flow therebetween for an adaptive video streaming system, in accordance with some embodiments of the disclosure.

DETAILED DESCRIPTION

Methods and systems are provided herein for adaptive bitrate streaming comprising advertisements.

As described above, adaptive streaming is fast becoming the most widely used method for video delivery to end-users over the internet. The ITU-T P.1203 standard is the first standardized quality of experience model for audiovisual HTTP-based adaptive streaming. The present disclosure provides an extension for the existing standardized video quality model as well as new formats, e.g., H.265, VP9, and AV1, and resolutions larger than full-HD (e.g., UHD-1). The main criterion for the development of better-quality monitoring and adaptation algorithms is to reduce the overall required bandwidth while not having any perceivable impact on the video and audio quality.

Adaptive bitrate streaming is a method of video streaming over HTTP where the source content is encoded at multiple bit rates. Each of the different bit rate streams is segmented into small multi-second parts. The segment size can vary depending on the particular implementation, but they are characteristically between two and ten seconds long. The current state of the art of delivering content by adaptive bitrate streaming is to provide a manifest comprising a plurality of URLs to the device requesting the content Typically, the client downloads a manifest file that describes the available stream segments, their URLs, and their respective bitrates. During stream start-up, the client (e.g., a user device such as a smartphone, tablet, laptop, PC, or the like) usually requests the segments from the lowest bit rate stream. If the client finds that the network throughput is greater than the bit rate of the downloaded segment, then it will request a higher bit rate segment. Later, if the client finds that the network throughput has deteriorated, it will request a lower bit rate segment. An adaptive bitrate algorithm in the client performs the key function of deciding which bit rate segments to download, based on the current state of the network.

The available bandwidth at the user's device (e.g., 6 Mbps) may, in some examples, fall between two bitrate variants (e.g., 4 and 8 Mbps) that are available at the media server. Scenes, segments, or frames of the content that have a low complexity, where there is little or no movement, will be downloaded at the same bitrate variant as those that have a high complexity, where there is a lot of movement. Thus, the high complexity scenes appear relatively poor in comparison to the low complexity scenes. A method of requesting higher bitrates that are higher than the user's available bandwidth for high complexity scenes is desirable to improve the user viewing experience.

Figure 1:
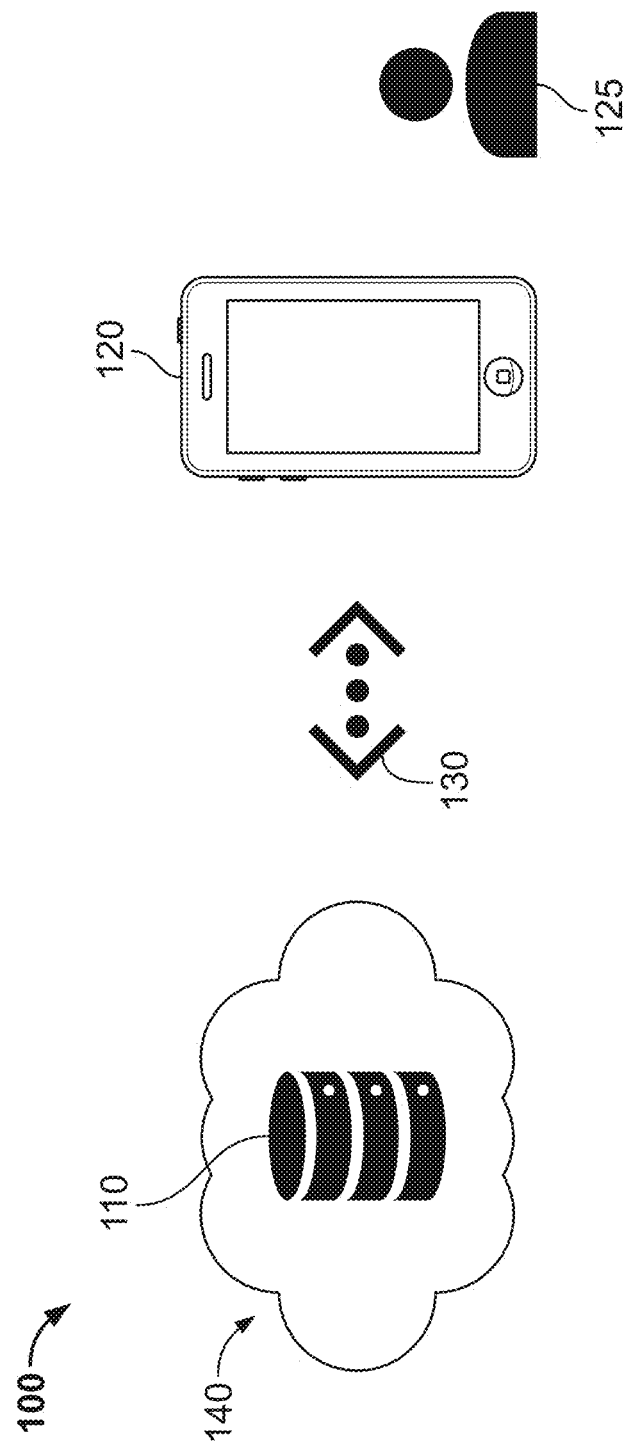
FIG. 1 illustrates an exemplary content delivery system, in accordance with some embodiments of the disclosure.

FIG. 1 illustrates an exemplary content delivery system, in accordance with some embodiments of the disclosure. content delivery system 100 comprises a media server 110, a user device 120, and a user 125. In some examples, media server 110 is hosted in cloud 140. However, in some examples, the media server 110 may be a physical edge server of a content delivery network hosted in a data center or the like. The media server 110 is communicatively coupled to user device 120 via communication link 130. In some examples, media content stored on media server 110, is compatible with known adaptive bitrate stream technologies (e.g., MPEG-DASH, Adobe HTTP Dynamic Streaming, Apple HTTP Live Streaming, Microsoft Smooth Streaming, QuavStreams Adaptive Streaming over HTTP, upLynk, or the like).

The media server 110, provides the content stored thereon to a plurality of users 125. User devices 120, that support adaptive bitrate streaming (e.g., DASH or HLS), need to monitor the available bandwidth to determine at what bitrate to request segments (e.g., a media content item) of the requested media content from the media server 110. In conventional systems, it is just the bandwidth that influences the determination of what bitrate to request.

Accordingly, in the present disclosure, the media player or user device 120 prioritizes its requests based on a complexity value of the segment, frame, or scene that is being requested by user device 120, and in some examples based on bandwidth current availability or an average bandwidth available. In some examples, the methods and systems, which are described in more detail below, retrieve the lowest bitrate associated with segment(s) with a complexity encoding of 'low' or some other value associated with 'low,' in order to download them faster since the file size for these segments is much smaller. In some examples, segments encoded at a higher bitrate have bigger file sizes—and require more time to download. For example, given that a scene is made up of multiple segments it is likely that multiple consecutive segments will have the same value for complexity encoding. Therefore, there are portions (multiple consecutive segments) of content that can be retrieved (e.g., fetched) at a lower bitrate and hence their file sizes are small compared to file sizes associated with segments of content encoded at a higher bitrate.

Therefore, over a plurality of segments, or media content items, that are requested from the media server 110, the user device 120 can determine a group or subset of media content items to retrieve from the media server 110. In addition, the user device 120 can select low bitrate variants of low complexity media content items, and high bitrate variants of high complexity media content items, ensuring that the average available bandwidth is not exceeded to ensure buffering doesn't occur, as would be expected in a situation wherein bitrate variants that require higher bandwidth than what is available are downloaded.

In some examples, in the first instance, high complexity media content items are requested and retrieved in the maximum bitrate variant that the instantaneous available bandwidth allows. However, thereafter, higher bitrate variants of higher complexity media content items are requested to replace the previously retrieved media content items. In this way, high complexity scenes or segments can be "upgraded" to higher bitrate variants where the average bandwidth allows. To accommodate this, the cached segments may be replaced. In some examples, cached low complexity segments are replaced by lower bitrate variants to allow the user device to cache higher complexity segments with higher bitrate variants.

Figure 2:
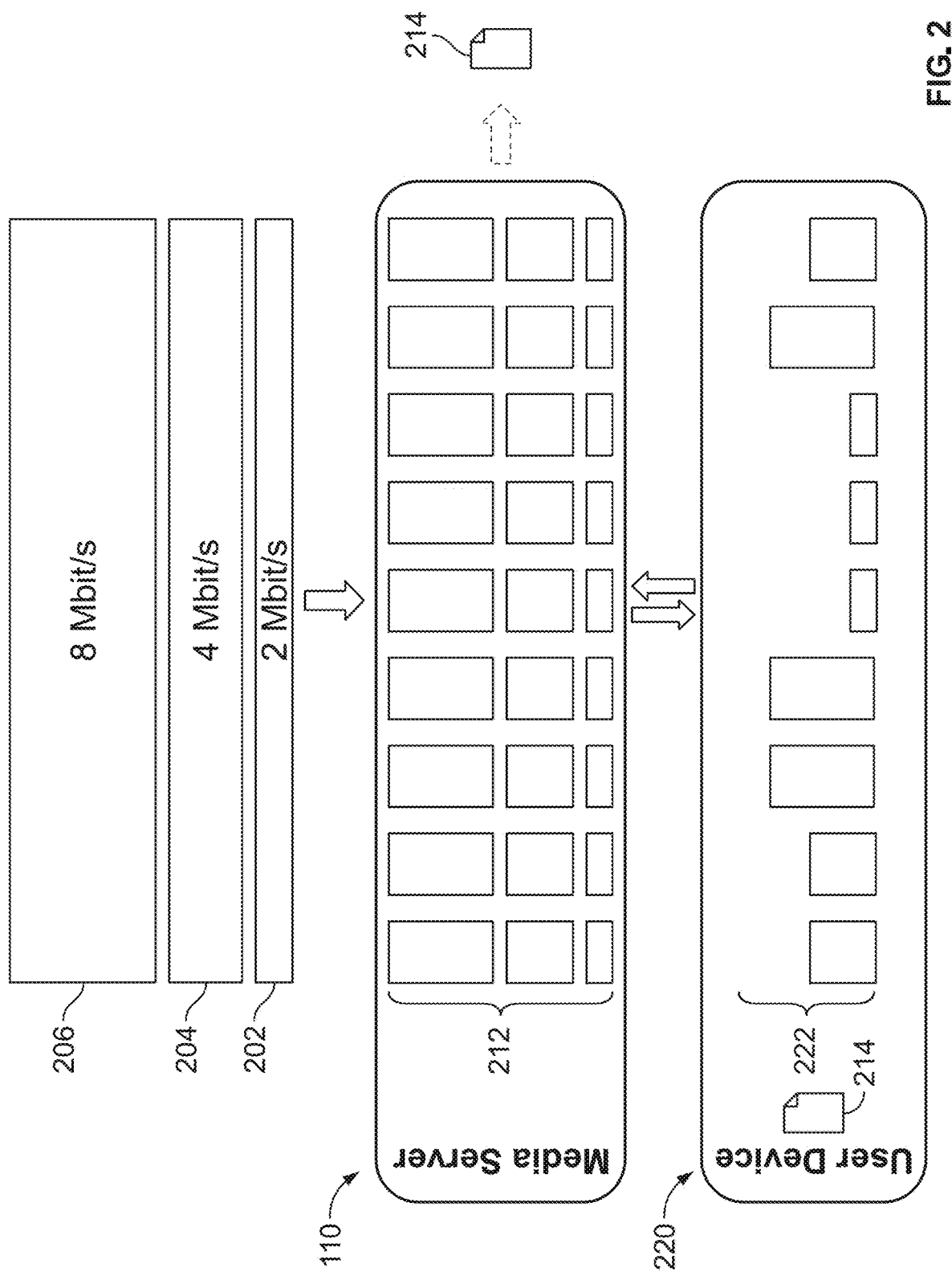
FIG. 2 is a pictorial representation of variable bitrate media content, in accordance with some embodiments of the disclosure.

FIG. 2 is a pictorial representation of variable bitrate media content, in accordance with some embodiments of the disclosure. A first bitrate variant 202, a second bitrate variant 204, and a third bitrate variant 206 are shown as 2 Mbit/s (2 megabits per second), 4 Mbit/s, and 8 Mbit/s, respectively. However, it should be understood that any suitable value of bitrates may be used and there may be more or fewer bitrate variants available for any content. In addition, there may also be intermediate bitrate values (e.g., 1 Mbit/s or values greater than 8 Mbit/s).

In some examples, the Media Server 110 separates the first bitrate variant 202, second bitrate variant 204, and third bitrate variant 206 into a plurality of segments 212. In some examples, the segment size is determined by the seconds of content to be consumed. However, in other examples, the segment size can be determined by a number of frames, the cache size of the user device, the length of a segment (in seconds), or the amount of data to be transmitted (i.e., a segment size limit). The plurality of segments 212 are encoded with resolutions ranging from, for example, 360p to 2160p and various quality levels using adaptive bitrate streaming compatible codecs and resolutions for adaptive video streaming formats. In some examples, the lowest bitrate variants are text, hyperlinked text, or a still image. In some examples, the highest bitrate variants are large video formats and high-quality audio. In some examples, each of the bitrate variants is separated by a minimum delta megabit per second (Mbps), for example, 1 Mbps or 2 Mbps.

In some examples, a master playlist 214 containing URLs to each of the plurality of segments 212 is outputted and transmitted from the media server 110 to the user device 120 as a manifest that describes the available stream segments of an adaptive video stream and their respective bitrate variants to a user device 220. Which bitrate variant the user device chooses can be changed from second to second or segment to segment. For example, if a user's available bandwidth changes, the user device 220 can select a different bitrate variant (i.e., a different video quality) to match the available bandwidth.

In some examples, the media server 110 may determine the complexity of the segment, a plurality of segments (e.g., a plurality of media content items), a number of frames, or an amount of data to be transmitted (e.g., a segment size). In some examples, when the media server 110 outputs the master playlist 214, such as a manifest, the media server can create an indication of the complexity of each of the segments, scenes, media content items, or frames.

In some examples, the segments as described with reference to FIG. 2 are segments of a plurality of segments of an adaptive bitrate stream (e.g., MPEG-DASH, Adobe HTTP Dynamic Streaming, Apple HTTP Live Streaming, Microsoft Smooth Streaming, QuavStreams Adaptive Streaming over HTTP, upLynk, or the like).

In some examples, the bandwidth available to user device 220 falls between two bitrate variants. For example, if the user device has an available bandwidth of 6 Mbit/s, this would fall between the recommend minimum bandwidth requirement for second bitrate variant 204 and third bitrate variant 206. Therefore, in such situations, it would be desirable to request some segments of the adaptive bitrate stream at the third bitrate variant 206 and some segments at the second bitrate variant 204, in such a way that the average bandwidth required is 6 Mbit/s or less (the maximum available at the user device 220). These example methods will be described in more detail below.

FIG. 3 is a tabular representation of segment selection based on complexity and average available bandwidth, in accordance with some embodiments of the disclosure. Table 300 comprises a series of rows 302 to 318 and columns. Row 302 shows that, in this example, there are three different segments, 1, 2, and 3. Row 304 shows that each of the segments 1, 2, and 3 have a corresponding complexity, high, medium, and low, each respectively represented by the symbols H, M, and L. Row 306 shows the segment duration for each of the H, M, and L versions of the complexity types, in this example each segment is 10 seconds long. In some examples, high complexity versions of a segment type may have a shorter duration to keep the overall size of the down. Similarly, in some examples, the lower complexity versions of segments may have a longer duration. However, in the example shown in table 300, each segment duration is equivalent.

Rows 308 to 312 show that for each segment 1, 2, and 3, there are three bitrate variants. The bitrate variants 308 to 312 have a minimum bandwidth requirement of 2, 4, and 8 Mbps respectively. As can be seen in table 300, each segment has an identified complexity and a plurality of bitrate variants. Row 314 shows the current available bandwidth of the user device to be 6 Mbps. Based on the available bandwidth alone, bitrate variant 2 would be selected for each of the segments 1, 2, and 3. However, as shown in row 318, based on the available bandwidth and the complexity of each segment, the methods and systems described herein allow for bitrate variant 3 to be selected for segment 1, bitrate variant 2 for segment 2, and bitrate variant 1 for segment 3. In this way, a high bitrate variant (i.e., higher than the current available bandwidth) for a high complexity segment is selected and a low bitrate variant (i.e., substantially lower than the current available bandwidth allows) for a low complexity segment is selected. As shown in table 300, over the three segments the average bitrate used by the user device is 4 Mbps which is less than the available bandwidth of the device.

The user experience is improved as a noticeable difference for segment 1 would be perceived, and an imperceptible difference for segment 3. Therefore, in some example, the complexity assigned to each segment is based on a threshold of motion, such that high motion corresponds to high complexity, and low motion corresponds to low complexity. In other words, in the example shown in table 300, the higher bitrate variant for the highest complexity segment was chosen to provide a better viewing experience to the end-user. Segment 3 has a low complexity and therefore the user viewing experience is not affected by selecting a lower bitrate variant.

Figure 4:
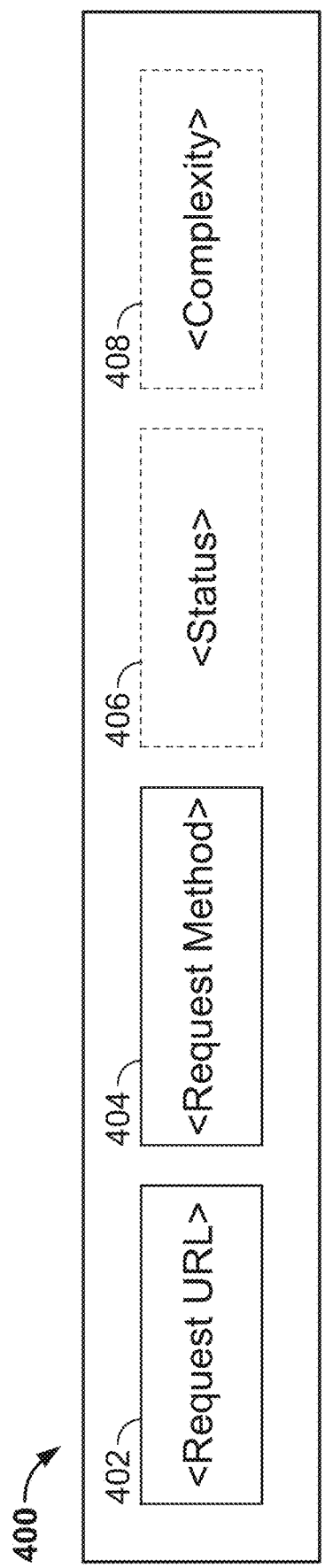
FIG. 4 is a pictorial representation of an adaptive bitrate request, in accordance with some embodiments of the disclosure.

FIG. 4 is a pictorial representation of an adaptive bitrate request, in accordance with some embodiments of the disclosure. In an exemplary request 400, there is provided a request URL 402, request method 303, and in some examples, status tag 406 and a complexity value 408.

Request 400 is illustrative of the form of a request to an adaptive bitrate video-on-demand service, such as a request to obtain a segment or media content item from a media server that serves DASH content. Request 400 is illustrative of the type of information a request, from a user device, for content delivery, from a media server, in accordance with some examples of the present disclosure, may contain.

As shown in FIG. 4, a request 400 contains a request URL 402. The request URL 402 may have been obtained from a master playlist or the like, such as that described below with reference to FIGS. 9 to 11. The request URL 402 may also contain some header information, that identifies request 400 as a request. In some examples, the request URL 402 is for a specific bitrate variant of a media content item, wherein the user device 220 is already aware of the complexity of the segment. For example, the manifest or master playlist 214 from the media server not only provides the request URLs 402 for a segment but also comprises an indication of the complexity of the segments.

In some examples, the request 400 contains a request method 404, which may be any one or more of a GET, PUT, POST, HEAD request method 404, for example. GET, PUT, POST, HEAD, as well as others such as DELETE, CONNECT, OPTIONS, TRACE, and PATCH, are a set of request methods known in the HTTP standard to indicate the desired actions to be performed for a given resource, these and others are considered examples of the request method 404 blocks of request 400. Each of the request methods implements a different semantic, but some common features are shared by a group of them: e.g., a request method can safe, idempotent, or cacheable. The GET method requests a representation of the specified resource, whereas the HEAD method asks for a response similar to that of a GET request without the response body. All of the request methods as discussed above may be adapted to include methods of the present disclosure. For example, the GET request may be modified to include a request for a specific complexity type.

In some examples, request 400 may also include a status response code 406, which indicates the status of the request 400 and comprise many known codes from 100 (continue) to 404 (not found) and the like. In this way, the user device can communicate effectively with the server. For example, to have a server check the request's headers, a client must send "Expect: 100-continue" as a header in its initial request and receive a 100 continue status code in response before sending the body. In some examples, the request 400 may also comprise a plurality of other meta-data, such as, for example, remote address, referrer-policy information, time stamps, request length, segment identifiers, media content identifiers, server identifier information, an indication of complexity, and the like.

In some examples, request 400 may also include a complexity value 408, which indicates the desired level of complexity that the user device 220 is seeking. However, in some examples, this is not necessary as the user device 220 can request, using the request URL 402, a media content item with a known complexity.

Figure 5:
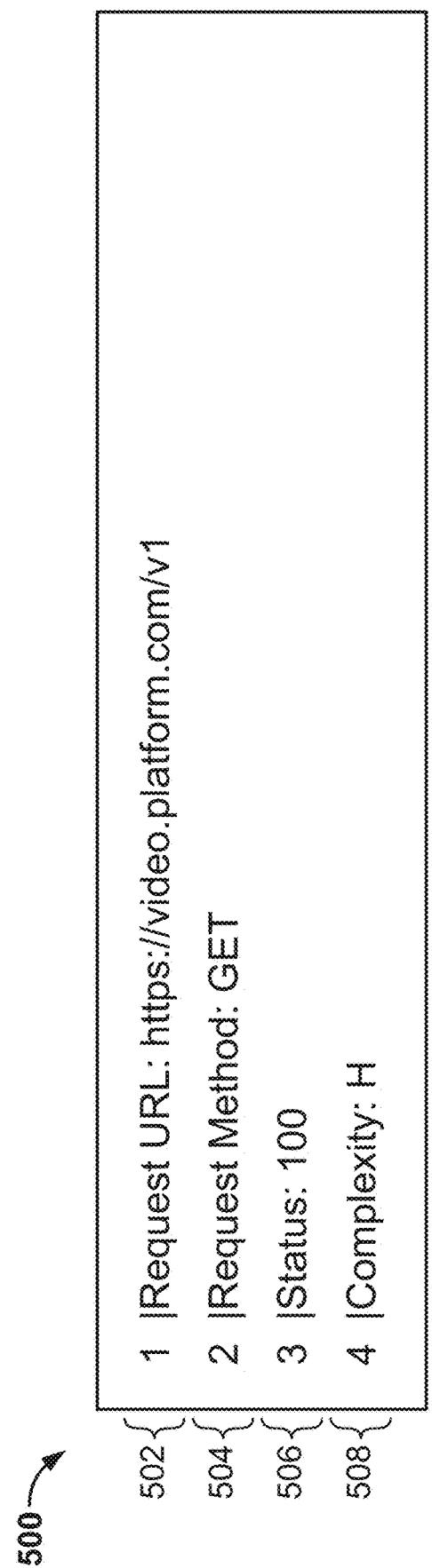
FIG. 5 illustrates an exemplary pseudo-code for an adaptive bitrate request, in accordance with some embodiments of the disclosure.

FIG. 5 illustrates an exemplary pseudo-code for an adaptive bitrate request, in accordance with some embodiments of the disclosure. FIG. 5 is considered to be an exemplary implementation of request 400 as described above with reference to FIG. 4. In request 500 there is provided a request URL 502, a request method 504, a status indicator 506, a complexity value 508.

Request 500 comprises a request URL 502 in line 1. The request URL 502 is shown as "Request URL: https://video-.platform.com/v1", this should be understood to be an exemplary way of indicating request URL 502 and is intended to be non-limiting. In this example, the URL for the requested content was retrieved from a master playlist 214, or manifest, of an HTTP dash adaptive bitrate media content. In line 2, the request method 504 is shown to be a GET request, and the status of the request 500 is shown in line 3, by status indication 506, which shows status code 100 (continue).

In some examples, request 500 may also include a complexity value 508, such as that shown on line 4, which indicates the desired level of complexity that the user device 220 is seeking. However, in some examples, this is not necessary as the user device 220 can request, using the request URL 502, a media content item with a known complexity.

Figure 6:
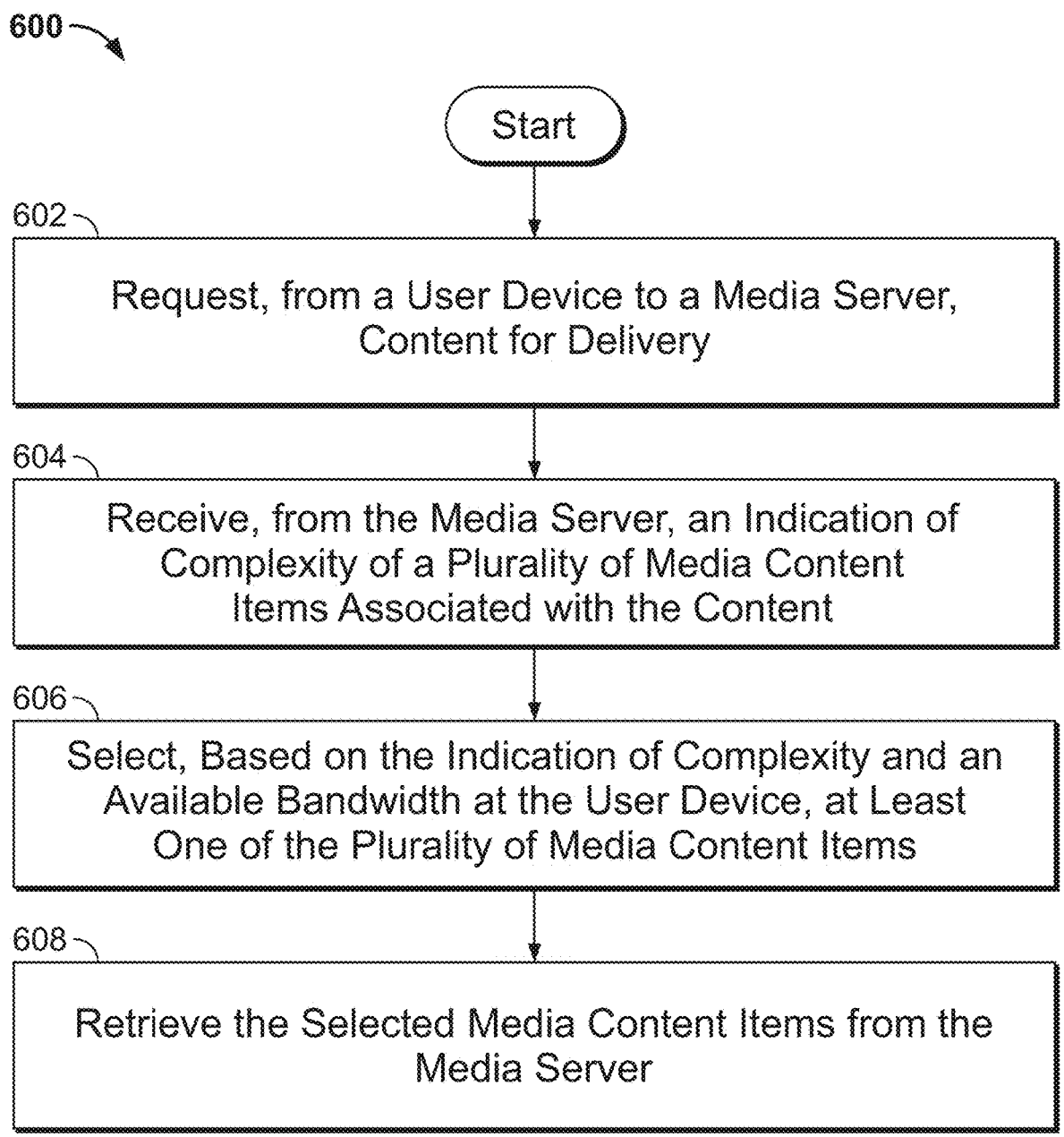
FIG. 6 illustrates an exemplary flowchart of the processing involved in selecting a plurality of content items based on complexity and bandwidth, in accordance with embodiments of the disclosure.

FIG. 6 illustrates an exemplary flowchart of the processing involved in selecting a plurality of content items based on complexity and bandwidth, in accordance with embodiments of the disclosure. Process 600 starts at step 602, wherein content for delivery is requested. In some examples, the request is made from a user device 220, e.g., a media transmission device, to a media server 110, e.g., an OTT platform or node in a content delivery network.

At step 604, an indication of the complexity of a plurality of media content items associated with the requested content is received. For example, the media server 110 may provide, in a manifest or master playlist, an indication of the complexity of a segment, scene, frame, or media content item. The indication of complexity may be alphanumerical or any other symbol that the user device 220 can interpret as an indication of complexity.

At step 606, at least one of the plurality of media content items is selected. In some examples, the selection is based on an indication of the complexity of the media content items and an available bandwidth at the user device. For example, the average available bandwidth may be over 2 or more media content items, e.g., 4 segments of adaptive bitrate multimedia content, such that multiple high bitrate segments can be selected and offset by selecting multiple low bitrate segments. In some examples, selecting at least one media content item to download is based on an average available bandwidth and the indication of complexity, such that the indication of complexity allows the user device to select media content items of a lower bitrate where the visual acuity is less important. In some examples, selecting at least one media content item to download is based on an average available bandwidth and the indication of complexity, such that the indication of complexity allows the user device to select media content items of a higher bitrate where visual acuity is more important.

At step 608, the selected media content items from the media server are retrieved. For example, the select media content items, or rather the URLs of the select media content items may for part of a request to a media server and, after some communication with the media server, downloaded and cached locally, ready for user consumption on the user device or on another device, such as a device on the user's LAN.

Figure 7:
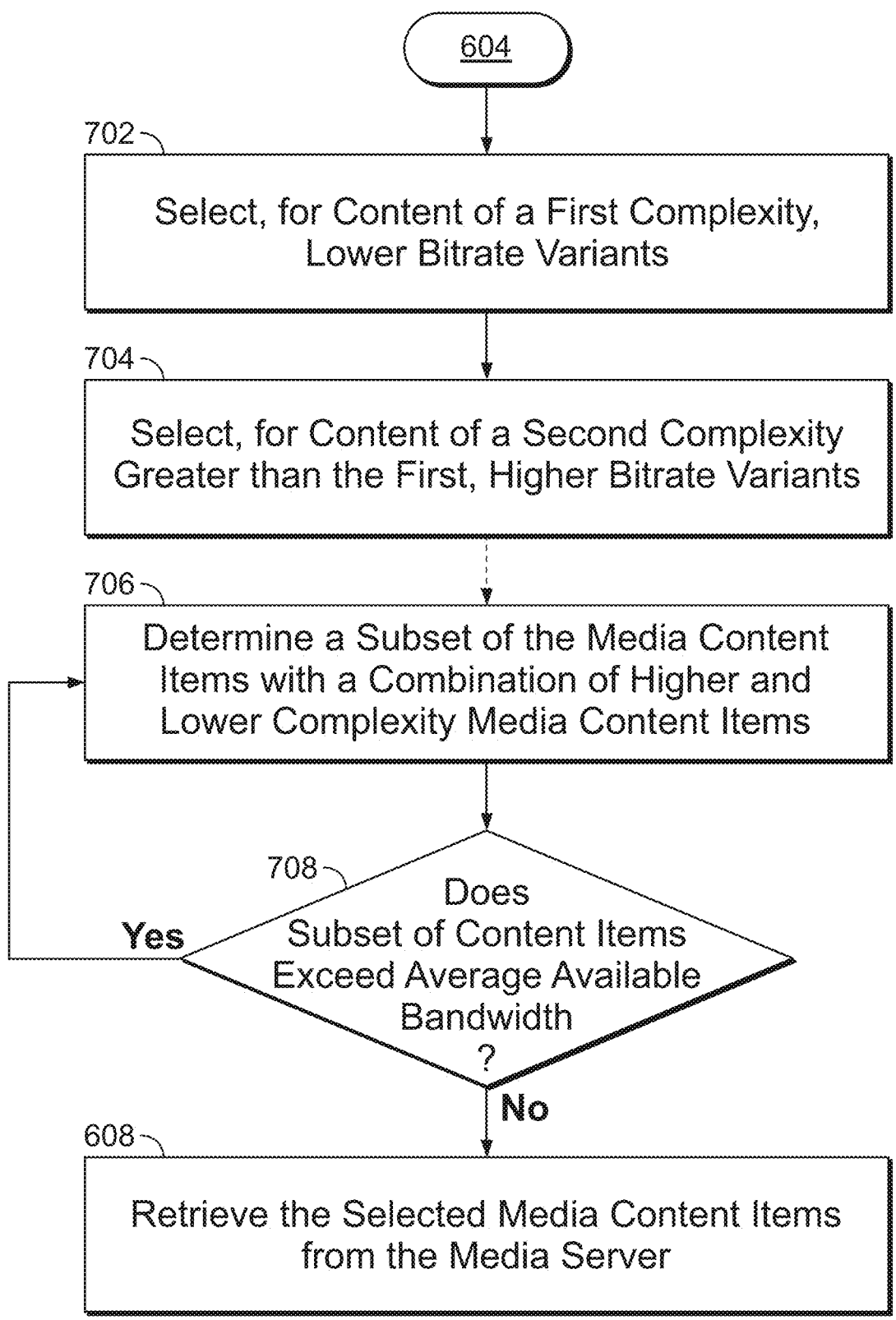
FIG. 7 illustrates an exemplary flowchart of the processing involved in selecting a plurality of content items based on complexity and bandwidth, in accordance with embodiments of the disclosure.

FIG. 7 illustrates an exemplary flowchart of the processing involved in selecting a plurality of content items based on complexity and bandwidth, in accordance with embodiments of the disclosure. Process 700 begins at 702. In some examples, step 702 follows step 604 and, in some examples, replaces step 606 of process 600. In some examples, step 702 is performed as a part of step 606 of process 600.

At step 702, for the content of a first complexity, lower bitrate variants are selected. At 704, for the content of a second complexity greater than the first, higher bitrate variants are selected. For example, as described previously, a relatively low complex media content item, compared to the other media content items, is selected at a lower bitrate variant, and a relative high complex media content item is selected at a higher bitrate variant to provide the optimal viewing experience to the user. In addition, selections based on complexity and available bitrate enable the user device 220 to store more media content items in the cache, therefore enabling the device to pre-load more content than previously.

Process 700 may continue on to step 706, wherein a subset of the media content items with a combination of higher and lower complexity media content items is determined. For example, determining a group of media content items with both high complexity and low complexity to download from the media server such that the available bandwidth is not exceeded. At step 708, it is determined whether the subset of media content items exceeds, or will exceed, the average available bandwidth.

If the answer to step 708 is yes, then process 700 reverts back to step 706 to determine the second subset of media content items with a mixture of higher and lower complexity media content items to retrieve. In an illustrative example, a first user is watching a YouTube video on an iPad via a mobile network, the video is streaming at 854×480 pixels without problems. Then, the road goes down into a valley, and the available bandwidth of the mobile network connection drops. The user device 220 determines that the available bandwidth has decreased and reacts to avoid buffering. The user device 220 determines a group of media content items to download with an average bandwidth that does not exceed the now smaller available bandwidth, to ensure that the video can continue to be consumed without interruption (e.g., buffering). Therefore, it can be said that if the available bandwidth changes it may be possible to reselect media content items with a higher or lower complexity than previously selected, based on the change in bandwidth.

If the answer to step 708 is no, then process 700 continues on to step 608 of process 600. Namely, that the subset of media content items is retrieved from the media server.

Figure 8:
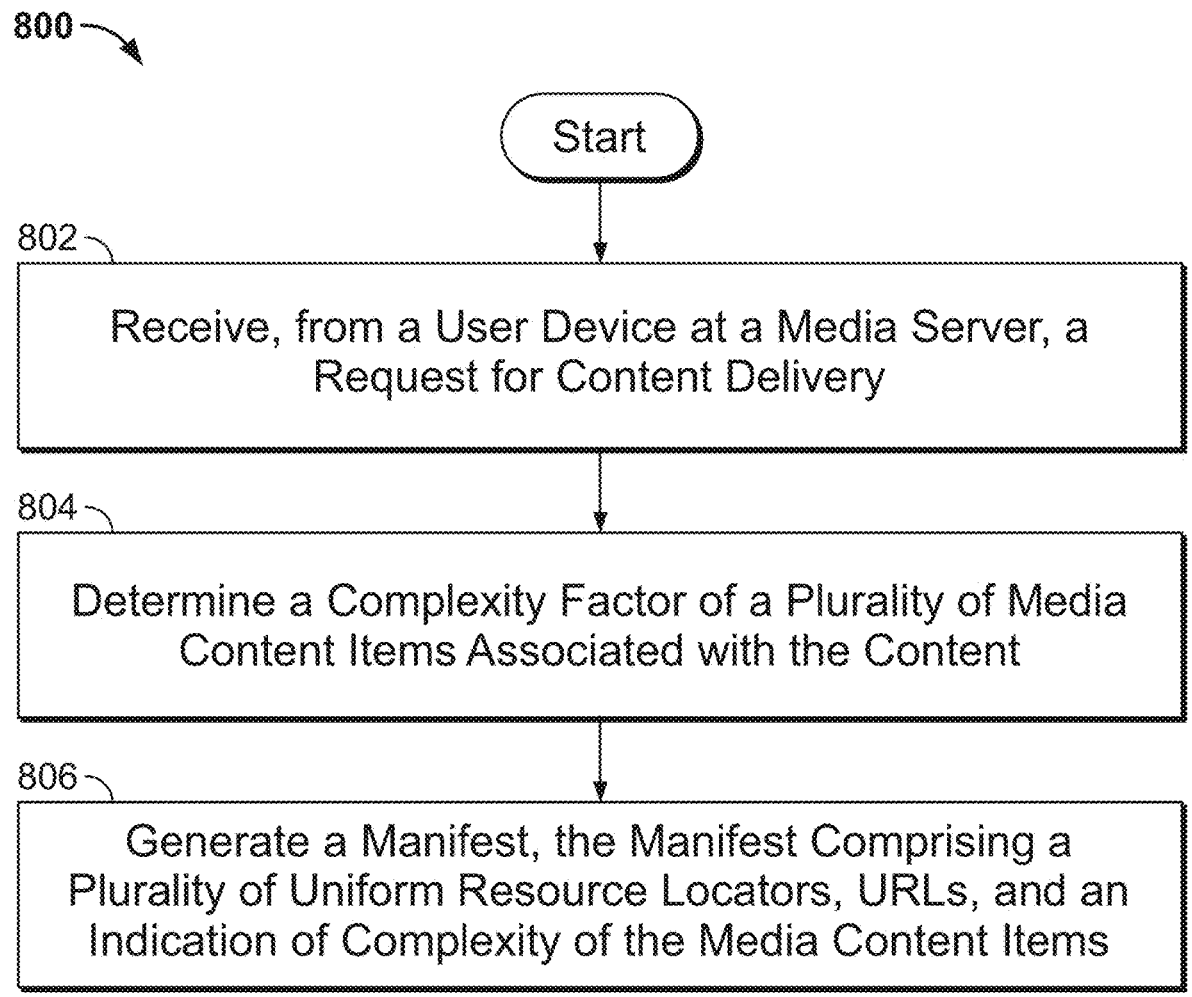
FIG. 8 illustrates an exemplary flowchart of the processing involved in generating a manifest for adaptive bitrate media content, in accordance with some embodiments of the disclosure.

FIG. 8 illustrates an exemplary flowchart of the processing involved in generating a manifest for content, such as adaptive bitrate media content, in accordance with some embodiments of the disclosure. Process 800 starts at step 802. At step 802, a request for content delivery is received. In some examples, the request is received from a user device, e.g., a media transmission device, smartphone, laptop, PC, or the like, and is received at a media server, e.g., an OTT platform or node in a content delivery network.

At step 804, a complexity factor of a plurality of media content items associated with the content is determined. For example, the complexity may be determined based on the motion of a segment or other ambient conditions, like lighting and background objects, and their changes over time. In some examples, the complexity is based on the number of unique object categories depicted in the scene. In some examples, the complexity is determined based on the number of pixels that change frame to frame.

At step 806, a manifest is generated. In some examples, the manifest comprises a plurality of Uniform Resource Locators, URLs, and an indication of the complexity of the media content items. An example of the form and content of the manifest is discussed in more detail with reference to FIGS. 9 to 11 below.

Figure 9:
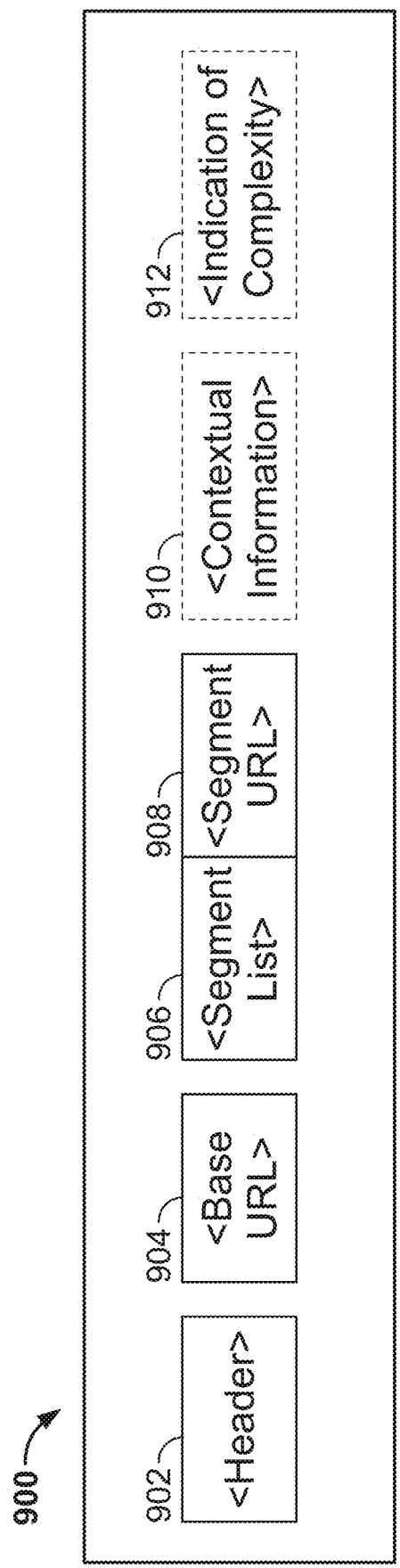
FIG. 9 is a pictorial representation of a manifest for adaptive bitrate content, in accordance with some embodiments of the disclosure.

FIG. 9 is a pictorial representation of a manifest for adaptive bitrate content, in accordance with some embodiments of the disclosure. In an exemplary manifest 900, there is provided a header 902, base URL 904, segment list 906, segment URL 908, and in some examples, contextual information 910, and an indication of complexity 912.

The manifest 900 is a container file for chunks of data that provide a user device with the information required for the user device to request a video or audio resource (e.g., media content or a media content item). As shown in FIG. 9, a manifest 900 starts with a header 902 and then contains a series of data blocks 902 to 912. In some examples, the header of the manifest identifies the format that the manifest is in (e.g., HTML, XML, or the like) and/or what adaptive bitrate technology the manifest relates to (e.g., DASH, HLS, or the like). In some examples, the header can be omitted from being present within manifest 900 because the format of the manifest 900 can be indicated by the filename extension suffix (e.g., ".xml," ".m3u8," ".txt," or the like), or a footer (not shown in FIG. 9, but included in the exemplary pseudo-code shown in FIG. 10).

In some examples, the data blocks of a manifest may comprise a block indicating a base URL 904, a Segment list 906, a segment URL 908, contextual information 910, and an indication of complexity 912. Other examples of data blocks include media type, representation blocks, ID tags, file names, initialization source, subtitles, and fallback sources (e.g., failover URLs).

In some examples, a data block may be a base URL 904 for signalling the base URL that all resources to follow will be obtained from. For example, the base URL 904 is the first part of a website URL such as "http://video.platform.com/v1." It is this base URL that later described segment URLs will be concatenated onto. Like any of the data blocks 904 to 912, the Base URL 904 may comprise any text or character with an equivalent Unicode Code Point. In some examples, Base URL 904 may be unique to the whole manifest that all subsequent URLs, such as Segment URL 908, are concatenated onto.

In some examples, a data block may be a segment list 906. In some examples, Segment list 906 may further comprise a segment reference, for example, a range of frames to obtain (e.g., range="0-862"), a start and end time to obtain (e.g., 1253s to 1258s), or a segment reference ID (e.g., "segment 12"). In some examples, the segment list 906 further comprises a bitrate variant reference ID or tag. In some examples, the segment list 906 with a range of frames to obtain is referred to as a media range. In some examples, there may be a minimum duration that the segment list 906 indicates. For example, a minimum duration of 10 seconds to obtain as a segment, although any period may be chosen as a minimum duration.

In some examples, a data block may be a segment URL 908. As mentioned briefly above, segment URL 908 is a suffix to be added to the base URL by the user device to complete the URL to a particular segment. In other words, base URL 904 and segment URL 908 together make the complete URL to any particular media content item contained within the manifest. In some examples, the whole URL per segment or bitrate variant is displayed in the segment list 906; however, this is often unnecessarily clogging up the manifest with a lot of repetitive data. In the concatenating examples, the overall manifest file size is kept to a minimum, reducing unnecessary overheads in the manifest file.

The manifest 900, may further comprise a data block that represents contextual information 910. In some examples, the context tag 910 is used to provide context to any one or more of the header 902, base URL 904, segment list 906, segment URL 908, or indication of complexity 912. The contextual information 910 may be a contextual tag that the logic of the user device can interpret. The contextual information may represent language, subject matter, segment metadata. Segment metadata includes, for example, codecs, audio tag, video tag, version numbers, encoding information, bandwidth markers, resolution or size of media content, or file names. In some examples, the context tag is configurable by the user or is configured by a user profile of the user, which can be obtained by control circuitry. For example, a user profile linked to the user device may configure the context tag to always select the highest bitrate variant or a maximum available based on the available bandwidth.

In some examples, the data blocks 904 to 912 further comprise meta-data. In some examples, contextual information block 910 may further comprise rules on waiting periods before acting when the fetch time is greater than the expected download time, etc. The start time, end time, and segment reference as discussed with reference to segment list 906 are considered an example of meta-data of the segment list 906 data block, for example.

One example of meta-data is the expected performance information. In some examples, the expected performance information is provided by an additional data block within the manifest 900, the indication of complexity 912. In some examples, the indication of complexity 912 may be embedded into any other of the header or data blocks 902 to 910, as will be described in more detail below with regard to FIGS. 10 and 11.

Subtitles are also considered to be meta-data of the manifest 900, subtitles are often provided in a format known as Web Video Text Tracks (WebVTT), which is a World Wide Web Consortium (W3C) standard for displaying timed text in connection with the HTML5 <track> element. Other common caption formats include XML-based Timed Text Markup Language (TTML) and the "SubRip" file format. The timed text refers to the presentation of text media in synchrony with other media, such as audio and video. Therefore, all timed text formats should be considered as falling within the scope of the methods and embodiments herein. While different timed text formats are compatible across a number of different devices and browsers due to their slight differences, all these formats contain text information to be displayed alongside a media asset such as audio, video, or a combination of both.

Similarly, metadata associated with the scene (e.g., cast, genre) and user preferences for such metadata can give the player an indication of priority and therefore, in some examples, the indication of complexity, or a complexity tag, can be ignored for some of the segments or such metadata can be used in addition to the encoding complexity value as an emphasis. For example, the switching between bitrate variants and the logic that governs that switching in a conventional system can be overridden during playback, if or when necessary, to accommodate the request and retrieval of segments of an adaptive bitrate video, or media content items, that include a high indication of complexity.

Any data blocks 902 to 912 which are not understood by legacy media asset players, due to the fact they have not been updated to read such data blocks, would be ignored. Therefore, in some examples, the manifest 900 is backward compatible with legacy user devices. Data blocks 902 to 912 may be separated by lines, commas, semi-colons, special characters, or any other common choices of the syntax used in computing languages such as C++, C#, Python, R, Java, JavaScript, HTML, and the like.

In some examples, the user device 220 can do an initial parse of the manifest to determine the signaled encoding complexity of the segments (e.g., in the case where the user is streaming a video-on-demand content item). The user device 220 can initially ignore the indication of complexity tags until after the steaming session has started and a healthy buffer has been maintained. The parsing of the manifest allows the user device 220 to determine how many segments, or which segments, that precede a high encoding complexity segment have a low encoding complexity value. The user device 220 can also signal to the media server 110 ahead of time that it intends to fetch a group of consecutive segments at a specific bitrate (e.g., the highest bitrate possible according to the available bandwidth at the user device 220) instead of making separate HTTP GET requests for each. Such an indication can also allow the media server 110, or an edge server, to make these segments available (if not already cached). In such a case, the media server's 110 response is the requested segments as separate segments or one video file containing the aggregate of those segments.

FIGS. 10 and 11 illustrate exemplary pseudo-code for an adaptive bitrate manifest, in accordance with some embodiments of the disclosure. FIGS. 10 and 11 are considered to be exemplary implementations of manifest 900 as described above with reference to FIG. 9.

FIG. 10 shows a manifest 1000. In manifest 1000 there is provided a header 1002, a base URL 1004, first contextual information 1010, a first segment list 1020, second contextual information 1030, a second segment list 1040, comprising first and second segment URLs 1042 and 1044, a footer 1050.

The manifest 1000 is a container file, usually comprising lines of instructions to be carried out by a user device. The manifest 1000 may be generated by a media server in response to a request to deliver media content. In particular, manifest 1000 starts with a header 1002 comprising lines 0 and 1 of the pseudo-code. In this example, the header informs the user device of the version and encoding formats of the manifest 1000 and includes some reference sources for information. The user device may be a web browser, media player, application on a smartphone, or another device.

The manifest 1000 comprises a base URL 1004 in line 2. The base URL 1004 is "http://video.platform.com/v1" and is shown between two tags, indicating the base URL 1004 to the user device.

Lines 4 and 10 comprise first and second contextual information 1010 and 1030. The first contextual information 1010, shown on line 4 of FIG. 10, comprises a contextual tag that indicates the following lines comprise information relating to English audio. The second contextual information 1030, shown on line 10, comprises a contextual tag that indicates the following lines comprise information relating to the video. The user device can therefore identify the lines following the first and second contextual information 1010 and 1030 as such.

Manifest 1000 comprises a first segment list 1020. First segment list 1020 follows the first contextual information 1010 on line 4, therefore the user device will understand that the first segment list 1020 is a segment list for audio, in particular, lines 5 to 9 of manifest 1000 provide the information required for the user device to obtain the audio contained within the base URL 1004. In some examples, the user device concatenates the base URL 1004 with the segment URL found within the first and second segment lists 1020 and 1040 to obtain the full URL where the media content item can be found.

Manifest 1000 comprises a second segment list 1040, comprising first and second segment URLs 1042 and 1044. The media content item that manifests 1000 comprises the URLs for the user device to obtain comprises multiple bitrate variants. In particular, a bitrate variant is contained within the first segment URL 1042 requiring a bandwidth of 1 Mbit/s (megabits per second) that has a resolution of 2160×1440 pixels per square inch, as shown in FIG. 10 in the metadata of lines 11 to 14. A second bitrate variant is contained within the second segment URL 1042 requiring a bandwidth minimum of 2 Mbit/s that has a resolution of 3840×2160 pixels per square inch as shown in FIG. 10 in the metadata of lines 15 to 17. The first and second segment URLs 1042 and 1044 points to a video titled "Joelsmixtape" encoded with advanced video coding (AVC) also referred to as H.264 or MPEG-4 Part 10, Advanced Video Coding (MPEG-4 AVC).

Manifest 1000 comprises a footer 1050. The footer indicates the end of the manifest 1000 and often comprises contextual information such as file extension suffixes (e.g., ".xml," ".m3u8," ".txt," or the like). Further information may also be included in the manifest 1000 files such as initialization sources, subtitles, and fallback sources (e.g., failover URLs).

Lines 4, 12, and 15 of manifest 1000 also comprise an indication of complexity, shown as an in-line tag. The indication of complexity further comprises a numeric value that user devices can interpret with logic to infer a relative complexity value. In some examples, the priority or a user profile of the user configures the indication of complexity. The indication of complexity in manifest 1000 is shown as a tag, COMPLEITY="X", where X is a numerical value. It should be understood that this example is intended to be non-limiting and numerous other examples of indicating the tag are possible. In some examples, the user device will search through the manifest 1000 to find parts of the manifest 1000 of interest indicated by the presence of contextual tags, complexity values, an indication of complexity tags, and/or contextual information 1010.

FIG. 11 shows part of a manifest 1100 comprising a first segment list 1110 and a second segment list 1120. The first and segment lists 1110 and 1120 of manifest 1100 are different examples of the first and second segment lists 1020 and 1040 of manifest 1000, as described with reference to FIG. 10 above. In particular, FIG. 11 illustrates a different way of implementing the indication of complexity in manifest 1100 compared to FIG. 10. For example, and as will be discussed in more detail below, FIG. 11 illustrates tagging each segment URL within the manifest 1100 with an indication of complexity.

In FIG. 11, the indication of complexity is shown for each segment within the first and second segment lists 1110 and 1120. For example, COMPLEXITY="L" is shown on line 3, to indicate that the segment contained within the associated segment URL has an indication of complexity that is low relative to the other segments in the segment list 1110. Each of the segment URLs on lines 3 to 5 and 10 to 12 is shown with an indication of complexity with a relative value of L, M, or H. In this way, the user device has an indication of complexity for each segment of a plurality of segments and allows greater granularity when determining a subset of the URLs to retrieve to maintain an optimal viewing experience, based on the granularity and available bandwidth of the user device.

Figure 12:
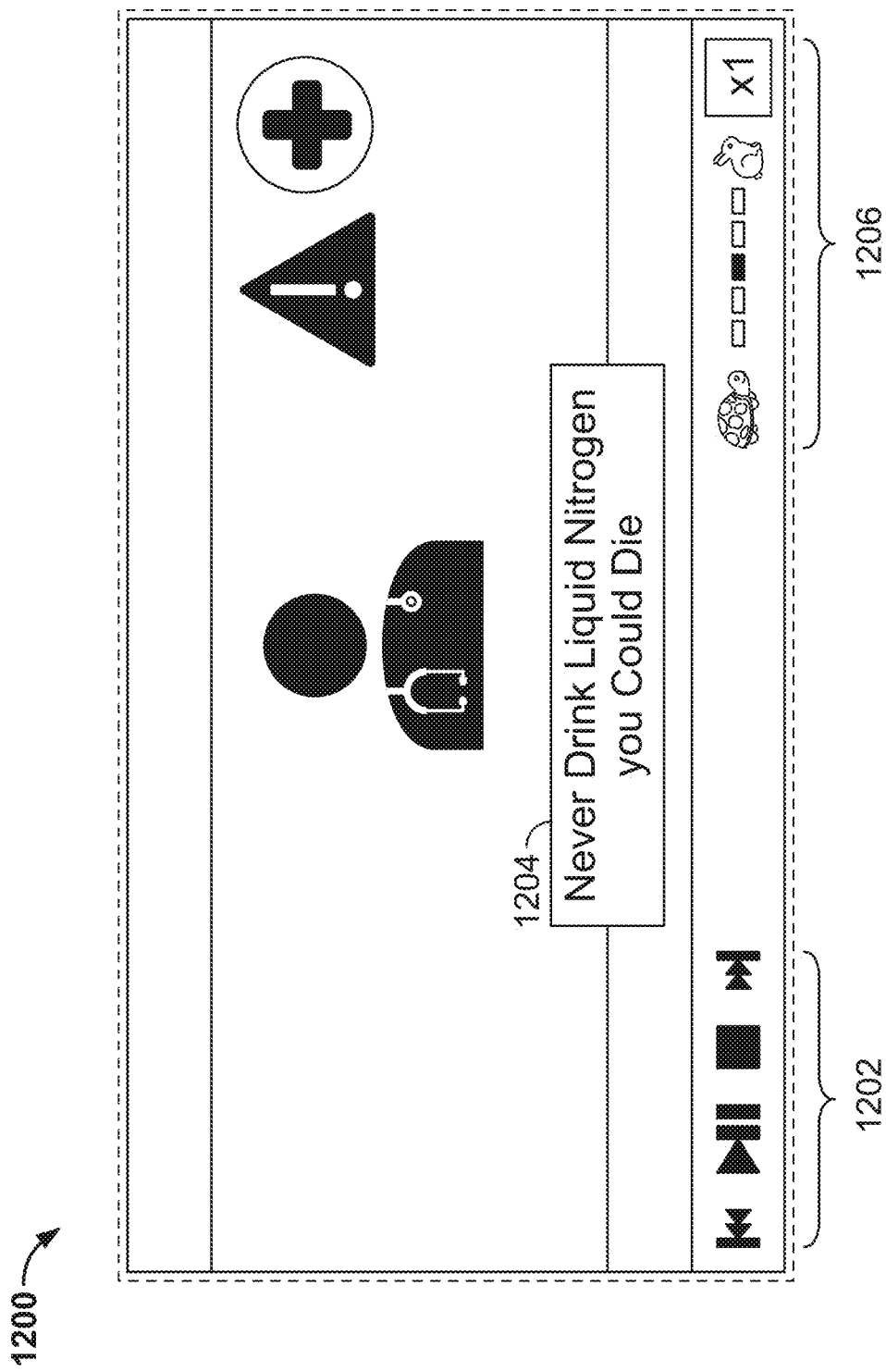
FIG. 12 illustrates an exemplary user device, in accordance with some embodiments of the disclosure.

FIG. 12 illustrates an exemplary user device, in accordance with some embodiments of the disclosure. The media player 1200 is showing an informative media content item regarding the dangers of drinking liquid nitrogen. The media content item could be one retrieved from manifests 900, 1000, or 1100. The user device 1200 also comprises content player controls 1202, timed text 1204, and playback rate indicator 1206.

In some examples, the media player 1200, within the user's device (not shown), can determine the best group of segments to download based on the available bandwidth and the indication of complexity from the adaptive bitrate video manifest, such as manifest 900, 1000 or 1100.

The content player controls 1202 comprise a play/pause button, stop button, rewind button, and fast-forward button, although these are largely for illustrative purposes and in other media asset players may be omitted in part, omitted in their entirety, shown in a different configuration, or be represented by other symbols. Playback rate indicator 1206 comprises a visual representation of the playback rate with a turtle and hare pictogram, largely for illustrative purposes and in other media asset players may be omitted in part, omitted entirely, shown in a different configuration, or be represented by other symbols. The timed text 1204 comprises the phrases "Never drink liquid nitrogen" and "You could die."

The user device 1200 is conventionally configured to play the media content item at "original speed" (e.g., at 1× playback speed); however, the user device 1200 may be configured to play the media asset at different speeds and any combination of trick play or variable playback rates greater than, equal to, or less than 1×.

Figure 13:
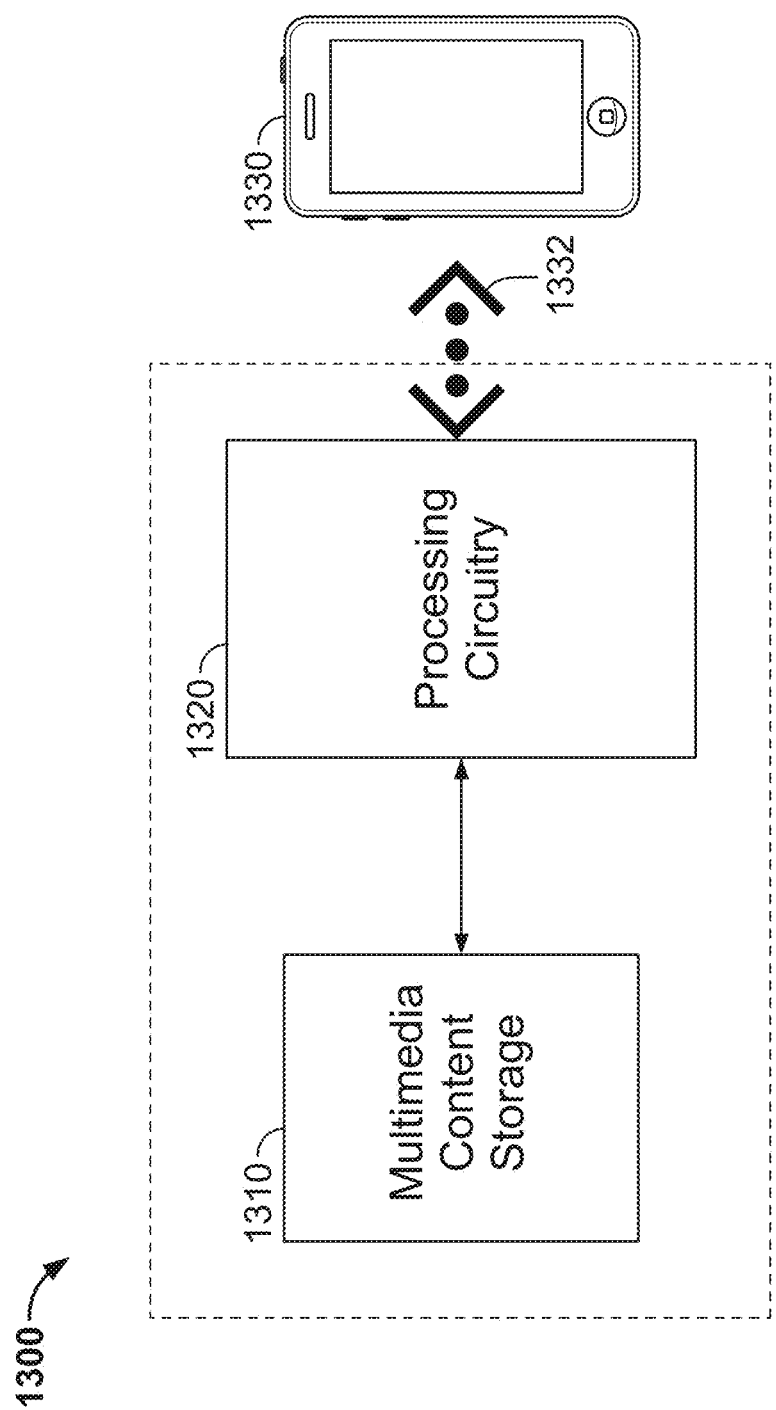
FIG. 13 illustrates an exemplary media server, in accordance with some embodiments of the disclosure.

FIG. 13 illustrates an exemplary media server, in accordance with some embodiments of the disclosure. FIG. 13. depicts an exemplary media server 1300 comprising a media content storage 1310, processing circuitry 1320, which is shown to be connected to a network device 1330 via communication link 1332. In some examples and as shown in FIG. 13, the media content storage 1310 is coupled to the processing circuitry 1320. The processing circuitry 1320 is configured to receive, from a media transmission device, a request for content delivery, determine a complexity factor of a plurality of media content items associated with the content, and generate a manifest, the manifest comprising a plurality of Uniform Resource Locators, URLs, and an indication of the complexity of the media content items.

The processing circuitry 1320 may comprise a plurality of processing elements, as is described in more detail with reference to FIG. 15, such as a processor or number of processors. Media server 1300 may further comprise an encoder (not shown). In some examples, the encoder is located within the processing circuitry 1320. In other examples, the encoder is located externally to the processing circuitry 1320. The processing circuitry 1320 may therefore be further configured to encode media content or the media content item to be transmitted to the network device 1330. The encoder may be further configured to encode the media content at a plurality of bitrates, based on the available bandwidth at the network device 1330.

The media server 1300 may further comprise network circuitry (not shown). In some examples, the network circuitry is located within the processing circuitry 1320. In other examples, the network circuitry is located externally to the processing circuitry 1320. The processing circuitry 1320 may therefore be further configured to communicate with the network device 1330 via communication link 1332. The means of communication between the network device 1230 and the processing circuitry 1320 is described in more detail with reference to FIG. 15.

FIG. 14 illustrates an exemplary media transmission device, in accordance with some embodiments of the disclosure. The media transmission system 1400 comprises a transceiver module 1410, a control module 1420, and a network module 1430. The media transmission system may communicate with an additional user device 1435, such as a home game way, smartphone, or other smart devices. In some examples, the transceiver module 1410 is configured to request, to a media server, media content for delivery, and receive, from the media server, an indication of the complexity of a plurality of media content items associated with the media content. The media content or media content item may be stored on a media content storage 1310, as described with reference to FIG. 13.

In some examples, the control module 1420 is coupled to the transceiver module 1410 and the network module 1430. In some examples, the control module 1420 is adapted to select, based on the indication of the complexity and an available bandwidth at the media transmission device, a first subset of the plurality media content items. Accordingly, the control module 1420 may select, based on the indication of the complexity and an available bandwidth at the user device, at least one of the plurality of media content items that enable a user to have a better viewing experience of more complex scenes. In addition, the control module enables a better viewing experience by maximizing the average available bandwidth to the user over a number of consecutive segments, maximizing the user viewing experience where possible. In some examples, the average may be determined over 2 or more segments. for example, 3 or 4 media content items. The control module can signal to the network module the media content items to download from the media server (such as server 1300).

In some examples, the network module 1430 is coupled with the transceiver module. In some examples, the network module 1430 is configured to retrieve the first subset of media content items from the media server, and determine an available bandwidth of the media transmission device. For example, the network module may determine the available bandwidth of the media transmission device and report the same to the control module, which then influences the selection of the first subset of the plurality of media content items. In addition, the network module may retrieve the selected subset of the plurality of media content items, after receiving a signal from the control module of which media content items have been selected.

In some examples, the transceiver module communicates with a second user device 1435 via communication link 1418. The communication link 1418 between the transceiver module 1410 and the second user device 1435 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the communication link 1418 is between the media transmission device 1400 and a home gateway device, which is in turn in communication with the second user device 1435. In some examples, the home gateway device may transmit a portion of a manifest 900, 1000, or 11000 to the second user device 1435. For example, the second user device 1435 may receive just the base URL 904 and the segment URL 908 to make the GET request for the media content item. In this way, it would be the home gateway device that would be carrying out the selecting of the first subset of the plurality of media content items, and the second user device 1435 would be providing the bandwidth information. However, these examples are considered to be non-limiting and other combinations of the features herein being spread over two or more devices are considered within the scope of this disclosure. For example, each of the transceiver module, the network module, and the control module may be separate internet of things (IoT) devices.

FIG. 15 is a block diagram representing devices, components of each device, and data flow therebetween for an adaptive video streaming system, in accordance with some embodiments of the disclosure. System 1500 is shown to include a client device 1518, a server 1502, and a communication network 1514. It is understood that while a single instance of a component may be shown and described relative to FIG. 15, additional instances of the component may be employed. For example, server 1502 may include or may be incorporated in, more than one server. Similarly, communication network 1514 may include or may be incorporated in, more than one communication network. Server 1502 is shown communicatively coupled to client device 1518 through communication network 1514. While not shown in FIG. 15, server 1502 may be directly communicatively coupled to client device 1518, for example, in a system absent or bypassing communication network 1514.

In some examples, the request to stream the media content is made by a user device or a network device. For example, a user device or a network device (e.g., a laptop, PC, smartphone, smart TV, or the like) requests a media server to stream the media content.

In some examples, the media content is an adaptive bitrate stream compatible with the MPEG-DASH standard, or other implementations such as Apple HLS. In some embodiments, the first stream of media content is encoded at a first maximum bitrate and/or the first resolution. For example, the request may be a request for the next segment of an adaptive bitrate stream, and therefore the first stream of media content is at a first maximum bitrate (or resolution) based on the first network bandwidth. In some examples, the second stream of media content is encoded at a second maximum bitrate and/or a second resolution. For example, the request may be a request for the second segment of an adaptive bitrate stream, and therefore the second stream of media content is at a second maximum bitrate (or resolution) based on new current network bandwidth, different from the first network bandwidth. The second stream may be a higher bitrate than the first stream, or vice versa, depending on the network bandwidth at the current time of the request. Accordingly, in some embodiments, each of the alternative streams comprises a plurality of bitrate variants.

In some examples, the media content is encoded using an adaptive bitrate streaming compatible codec. There are numerous examples of video codecs that are adaptive bitrate streaming compatible (e.g., x264, OpenH264, H.264/ MPEG-4 AVC, which are all codecs compatible with the video format H.264). Moreover, there are numerous examples of video formats (e.g., H.264, H.265, VP9, AV1), each of which has numerous examples of video codecs.

Communication network 1514 may comprise one or more network systems, such as, without limitation, an internet, LAN, WIFI, or other network systems suitable for audio processing applications. In some embodiments, system 1500 excludes server 1502, and functionality that would otherwise be implemented by server 1502 is instead implemented by other components of system 1500, such as one or more components of communication network 1514. In still other embodiments, server 1502 works in conjunction with one or more components of communication network 1514 to implement certain functionality described herein in a distributed or cooperative manner. Similarly, in some embodiments, system 1500 excludes client device 1518, and functionality that would otherwise be implemented by the client device 1518 is instead implemented by other components of system 1500, such as one or more components of communication network 1514 or server 1502 or a combination. In still other embodiments, the client device 1518 works in conjunction with one or more components of communication network 1514 or server 1502 to implement certain functionality described herein in a distributed or cooperative manner.

The client device 1518 includes control circuitry 1528, display 1534, and input-output circuitry 1516. Control circuitry 1528 in turn includes transceiver circuitry 1562, storage 1538, and processing circuitry 1540. In some embodiments, client device 1518 or control circuitry 1528 may be configured as client device 1330 of FIG. 13.

Server 1502 includes control circuitry 1520 and storage 1524. Each of the storages 1524 and 1538 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1524, 1538 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 1524, 1538 or instead of storages 1524, 1538. In some embodiments, the pre-encoded or encoded media content, in accordance with the present disclosure, may be stored on one or more of storages 1524, 1538.

In some embodiments, control circuitry 1520 and/or 1528 executes instructions for an application stored on the memory (e.g., storage 1524 and/or storage 1538). Specifically, control circuitry 1520 and/or 1528 may be instructed by the application to perform the functions discussed herein. In some implementations, any action performed by control circuitry 1520 and/or 1528 may be based on instructions received from the application. For example, the application may be implemented as software or a set of executable instructions that may be stored on storage 1524 and/or 1538 and executed by control circuitry 1520 and/or 1528. In some embodiments, the application may be a client/server application where only a client application resides on client device 1518, and a server application resides on server 1502.

The application may be implemented using any suitable architecture. For example, it may be a stand-alone application wholly implemented on client device 1518. In such an approach, instructions for the application are stored locally (e.g., in storage 1538), and data for use by the application is downloaded periodically (e.g., from an out-of-band feed, from an internet resource, or using another suitable approach). Control circuitry 1528 may retrieve instructions for the application from storage 1538 and process the instructions to perform the functionality described herein. Based on the processed instructions, control circuitry 1528 may determine a type of action to perform in response to input received from the input/output path (or input-output circuitry) 1516 or the communication network 1514. For example, in response to a network bandwidth maximum, control circuitry 1528 may perform the steps of processes relative to various embodiments discussed herein.

In client/server-based embodiments, control circuitry 1528 may include communication circuitry suitable for communicating with an application server (e.g., server 1502) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1514). In another example of a client/server-based application, control circuitry 1528 runs a web browser that interprets web pages provided by a remote server (e.g., server 1502). For example, the remote server may store the instructions for the application in a storage device. The remote server may process the stored instructions using circuitry (e.g., control circuitry 1528) and/or generate displays. Client device 1518 may receive the displays generated by the remote server and may display the content of the displays locally via display 1534. This way, the processing of the instructions is performed remotely (e.g., by server 1502) while the resulting displays, such as the display windows described elsewhere herein, are provided locally on the client device 1518. Client device 1518 may receive inputs from the user via input circuitry 1516 and transmit those inputs to the remote server for processing and generating the corresponding displays. Alternatively, client device 1518 may receive inputs from the user via input circuitry 1516 and process and display the received inputs locally, by control circuitry 1528 and display 1534, respectively.

Server 1502 and client device 1518 may transmit and receive content and data such as media content via communication network 1514. For example, server 1502 may be a media content provider, and client device 1518 may be a smart television configured to download or stream media content, such as a YouTube video, from server 1502. Control circuitry 1520, 1528 may send and receive commands, requests, and other suitable data through communication network 1514 using transceiver circuitry 1560, 1562, respectively. Control circuitry 1520, 1528 may communicate directly with each other using transceiver circuitry 1560, 1562, respectively, avoiding communication network 1514.

It is understood that client device 1518 is not limited to the embodiments and methods shown and described herein. In non-limiting examples, the client device 1518 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1520 and/or 1518 may be based on any suitable processing circuitry such as processing circuitry 1526 and/or 1540, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores).

In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1520 and/or control circuitry 1518 are configured to implement a media content operation system, such as systems, or parts thereof, that perform various media content manipulation processes described herein.

Client device 1518 receives a user input 1504 at input circuitry 1516. For example, client device 1518 may receive a user input like a user swipe or user touch, as previously discussed. In some embodiments, client device 1518 is a media device (or player), with the capability to access media content. It is understood that client device 1518 is not limited to the embodiments and methods shown and described herein. In non-limiting examples, the client device 1518 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1504 may be received from a user selection-capturing interface that is separate from device 1518, such as a remote-control device, trackpad, or any other suitable user movement sensitive or capture devices, or as part of device 1518, such as a touchscreen of display 1534. Transmission of user input 1504 to client device 1518 may be accomplished using a wired connection, such as an audio cable, USB cable, ethernet cable, or the like attached to a corresponding input port at a local device, or may be accomplished using a wireless connection, such as BLU-ETOOTH, Wi-Fi, WiMAX, ZIGBEE, GSM, UTMS, CDMA, TDMA, 3G, 4G, 4G LTE, or any other suitable wireless transmission protocol. Input circuitry 1516 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1540 may receive input 1504 from input circuit 1516. Processing circuitry 1540 may convert or translate the received user input 1504 that may be in the form of gestures or movement to digital signals. In some embodiments, input circuit 1516 performs the translation to digital signals. In some embodiments, processing circuitry 1540 (or processing circuitry 1526, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
   transmitting, from a user device to a media server, a request for content for delivery;
   receiving, from the media server, an indication of complexity of a plurality of media content items associated with the content;
   selecting, based on the indication of complexity and an available bandwidth at the user device, at least one of the plurality of media content items;
   retrieving the selected media content items from the media server; and
   determining a first subset of the media content items with a combination of higher and lower complexity media content items, wherein the first subset of media content items are consecutive segments of the content.

2. The method of claim 1, wherein the selecting comprises:
   selecting, for each media content item, a bitrate variant of the media content item from the media server.

3. The method of claim 1, further comprising:
   determining an average available bandwidth of the user device;
   wherein the average is determined over an estimated time for retrieving a plurality of media content items.

4. The method of claim 1, further comprising:
selecting, for content of a first complexity, lower bitrate variants; and
selecting, for content of a second complexity greater than the first, higher bitrate variants.

5. The method of claim 1, wherein the combination does not exceed the average available bandwidth at the user device.

6. The method of claim 1, further comprising:
detecting an increase in available bandwidth at the user device;
in response to detecting the increase in available bandwidth at the user device, selecting a second subset of the plurality of media content items; and
retrieving the second subset of the plurality of media content items;
wherein the second subset of media content items comprises more media content items with higher complexity than the first subset of media content items.

7. The method of claim 1, further comprising:
detecting a decrease in available bandwidth at the user device;
in response to detecting the decrease in available bandwidth at the user device, selecting a third subset of the plurality of media content items; and
retrieving the third subset of the plurality of media content items;
wherein the third subset of media content items comprises more media content items with lower complexity than the first subset of media content items.

8. The method of claim 1, wherein the request for content delivery comprises an indication to retrieve consecutive segments of the content.

9. The method of claim 1, wherein:
the request for content delivery comprises contextual information; and
selecting at least one of the plurality media content items is further based on the contextual information.

10. A media transmission device communicatively coupled to a media server, the media transmission device comprising a control module, a transceiver module, and a network module, configured to:
request, from the media server, content for delivery;
receive, from the media server, an indication of complexity of a plurality of media content items associated with the content;
select, based on the indication of complexity and an available bandwidth at the media transmission device, at least one of the plurality media content items;
retrieve the selected media content items from the media server; and
determine a first subset of the media content items with a combination of higher and lower complexity media content items, wherein the first subset of media content items are consecutive segments of the content.

11. The media transmission device of claim 10, further configured to:
select, for each media content item, a bitrate variant of the media content item from the media server.

12. The media transmission device of claim 10, further configured to:
determine an average available bandwidth of the media transmission device;
wherein the average is determined over an estimated time for retrieving a plurality of media content items.

13. The media transmission device of claim 10, further configured to:
select, for content items of a first complexity, lower bitrate variants; and
select, for content items of a second complexity greater than the first, higher bitrate variants.

14. The media transmission device of claim 10, wherein the combination does not exceed the average available bandwidth at the media transmission device.

15. The media transmission device of claim 10, further configured to:
detect an increase in available bandwidth at the user device;
in response to detecting the increase in available bandwidth at the media transmission device, select a second subset of the plurality of media content items; and
retrieve the second subset of the plurality of media content items;
wherein the second subset of media content items comprises more media content items with higher complexity than the first subset of media content items.

16. The media transmission device of claim 10, further configured to:
detecting a decrease in available bandwidth at the user device;
in response to detecting the decrease in available bandwidth at the media transmission device, select a third subset of the plurality of media content items; and
retrieve the third subset of the plurality of media content items;
wherein the third subset of media content items comprises more media content items with lower complexity than the first subset of media content items.

17. The media transmission device of claim 10, wherein the first subset of media content items are consecutive segments of the content.

18. The media transmission device of claim 10, wherein the request for content delivery comprises an indication to retrieve consecutive segments of the content.

19. A method comprising:
transmitting, from a user device to a media server, a request for content for delivery;
receiving, from the media server, an indication of complexity of a plurality of media content items associated with the content;
selecting, based on the indication of complexity and an available bandwidth at the user device, at least one of the plurality of media content items;
retrieving the selected media content items from the media server; and
determining a first subset of the media content items with a combination of higher and lower complexity media content items;
detecting a decrease in available bandwidth at the user device;
in response to detecting the decrease in available bandwidth at the user device, selecting a third subset of the plurality of media content items; and
retrieving the third subset of the plurality of media content items;
wherein the third subset of media content items comprises more media content items with lower complexity than the first subset of media content items.

* * * * *